(12) United States Patent
Tokushima

(10) Patent No.: US 8,170,383 B2
(45) Date of Patent: May 1, 2012

(54) OPTICAL CONVERTER

(75) Inventor: Masatoshi Tokushima, Tokyo (JP)

(73) Assignee: NEC Corporation, Tokyo (JP)

( * ) Notice: Subject to any disclaimer, the term of this patent is extended or adjusted under 35 U.S.C. 154(b) by 159 days.

(21) Appl. No.: 12/517,100

(22) PCT Filed: Nov. 30, 2007

(86) PCT No.: PCT/JP2007/073195
§ 371 (c)(1),
(2), (4) Date: Jun. 1, 2009

(87) PCT Pub. No.: WO2008/066160
PCT Pub. Date: Jun. 5, 2008

(65) Prior Publication Data
US 2010/0067846 A1   Mar. 18, 2010

(30) Foreign Application Priority Data
Dec. 1, 2006   (JP) .................................. 2006-325731

(51) Int. Cl.
*G02B 6/12* (2006.01)
*G02B 6/26* (2006.01)
*G02B 6/42* (2006.01)

(52) U.S. Cl. ................ 385/14; 385/28; 385/30; 385/43; 385/49

(58) Field of Classification Search ........................ None
See application file for complete search history.

(56) References Cited

U.S. PATENT DOCUMENTS

| 6,253,009 B1 * | 6/2001 | Lestra et al. ...................... 385/50 |
| 6,571,039 B1 * | 5/2003 | Al-hemyari et al. ............. 385/43 |
| 6,973,236 B2 * | 12/2005 | So et al. ........................... 385/37 |
| 7,359,593 B2 * | 4/2008 | Little ................................ 385/30 |
| 2002/0146205 A1 * | 10/2002 | Shimoda .......................... 385/43 |
| 2003/0174956 A1 * | 9/2003 | Viens ................................ 385/43 |
| 2004/0114869 A1 * | 6/2004 | Fike et al. ........................ 385/43 |
| 2005/0175287 A1 * | 8/2005 | Pan et al. ......................... 385/43 |
| 2006/0204175 A1 * | 9/2006 | Laurent-Lund et al. ......... 385/43 |
| 2008/0002928 A1 * | 1/2008 | Li ..................................... 385/14 |

FOREIGN PATENT DOCUMENTS

| JP | 2000206352 A | 7/2000 |
| JP | 2000249856 A | 9/2000 |
| JP | 2003315608 A | 11/2003 |
| JP | 2005043784 A | 2/2005 |
| JP | 2006171078 A | 6/2006 |

OTHER PUBLICATIONS

International Search Report for PCT/JP2007/073195 mailed Dec. 25, 2007.

* cited by examiner

*Primary Examiner* — Tina Wong

(57) ABSTRACT

An optical converter comprises: a first waveguide, a second waveguide, and a tapered waveguide arranged between both the waveguides, wherein heights of a core of the first waveguide and a core of the second waveguide are different; both ends in a direction of wave guiding of a core of the tapered waveguide are respectively connected to the core of the first waveguide and the core of the second waveguide; cross-sectional shapes and refractive indexes of cores of two waveguides that are connected change continuously or in a stepwise manner at each connection part; and a cross-sectional shape and refractive index of the core of the tapered waveguide change continuously or in a stepwise manner along a direction of wave guiding.

16 Claims, 4 Drawing Sheets

The present application is the National Phase of PCT/JP2007/073195, filed Nov. 30, 2007, which is based upon and claims the benefit of the priority of an earlier Japanese Patent Application No. 2006-325731, filed on Dec. 1, 2006, the disclosure of which is incorporated herein in its entirety by reference thereto.

OPTICAL CONVERTER

TECHNICAL FIELD

The present invention relates to an optical converter and a method for manufacturing the same, and in particular to an optical converter for an optical integrated circuit and a method for manufacturing the same. Furthermore, the present invention relates to an optical integrated circuit that includes an optical converter and a method for manufacturing the same.

BACKGROUND ART

A silicon-on-insulator (SOI) substrate is a laminated substrate in which a silicon dioxide thin film, referred to as a buried oxide film, is formed, and furthermore, a silicon thin film, referred to as a silicon active layer, is formed thereon. The SOI can be used as a substrate of an optical integrated circuit; by etching the silicon active layer into a wire shape, it is possible to form an optical waveguide that has silicon as a core and has the buried oxide film and air as cladding. The silicon core may be embedded in silicon dioxide. (While light is guided along the waveguide, an electromagnetic field of the guided light is distributed so as to penetrate into the cladding from the core as a center. Therefore, the "waveguide" includes not only the core but also the cladding, and the "wire" refers to only the core of the waveguide. A similar situation applies in the following description. In addition "core width" refers to a distance between side faces of the core in a cross-section perpendicular to a direction of wave guiding, and "core height" refers to a distance between top and bottom faces of the core in a cross-section perpendicular to the direction of wave guiding.)

Combining micro elemental optical devices that have various basic functions and integrating them on a single SOI substrate can produce optical integrated circuits. Most elemental optical devices that form the optical integrated circuit are made of waveguides, which makes miniaturization of the devices relatively easy. Most basic elemental optical devices are optical waveguides themselves, and some of them are linear waveguides, bent waveguides, branched waveguides. By combining these waveguides as parts, it is possible to construct optical devices such as a directional coupler, an interferometer, and the like. Furthermore, by combining a wavelength filter with these optical devices, it is possible to construct an optical device such as wavelength multiplexers/demultiplexers, optical switches, or the like.

In the optical integrated circuit as mentioned above, the most basic elemental optical devices are optical waveguides. Usually, cross-sectional shape and size of a core of the optical waveguide are selected so that the optical waveguide has a single mode. However, cross-sectional shape and size of the core of a preferred waveguide in various devices are not necessarily the same (for example, refer to Patent Document 1 and Patent Document 2). If the optical waveguide is used for optical wiring, the most important characteristic of the optical waveguide is that waveguide loss is small. When it is etched into its wire shape, the silicon core suffers side wall roughness, which causes scattering loss. Therefore, it is desirable that the height of the core of a linear waveguide is small so that the area of side walls can be small. However, if the core is too thin (that is, the core height is too low), mode field can be to large, which will result in crease of propagation loss rather than decrease of a bent waveguides. Since an optical device such as a directional coupler includes many bent waveguides, in the case of optical circuits whose integration high, the high of a core should be large. Since thickness of a silicon active layer of an SOI substrate is uniform, in conventional technology, taking into account a trade-off between loss reduction and improvement of integration of the whole optical circuit on the substrate, the height of the core of the waveguide of the whole optical circuit has been selected.

[Patent Document 1]
JP Patent Kokai Publication No. JP-P2000-206352A
[Patent Document 2] JP Patent Kokai Publication No. JP-P2000-249856A

DISCLOSURE OF THE INVENTION

Problems to be Solved by the Invention

The matter disclosed in the abovementioned Patent Documents 1 and 2 is incorporated herein by reference thereto. An analysis of related technology according to the present invention is given as follows. In this type of conventional technology, when designing a cross-sectional shape of a core of a waveguide of an entire optical circuit, since loss reduction and increase of integration of an optical integrated circuit have a trade-off relationship, there is a problem that it is difficult to design the cross-sectional shape and size of the core so as to have optimized states for both of these at the same time.

Furthermore, since the height of the waveguide core, determined according to the trade-off between the loss reduction and the integration increase, differs according to the optical circuit, there is a problem in that it is necessary to use an SOI substrate that has a silicon active layer thickness which differs for each optical circuit.

It is an object of the present invention to eliminate the trade-off relationship that occurs between the loss reduction and integration increase, with respect to selection of the height of the waveguide core included in the optical circuit. It is a further object to thus enable realization of the optical circuit on a single SOI substrate, and to improve productivity of the optical integrated circuit.

Moreover, a spot size converter, which changes core cross-sectional size by increasing the core height and width at the same time, is disclosed in, for example, Patent Document 1 and Patent Document 2. However, if waveguides having different heights are connected and it is desired to select widths so as to have a single mode with regard to waveguides before and after the connections, or when two flat waveguides are connected so that long side directions of core cross-sections are orthogonal to each other, there is a problem that it is not possible to apply a conventional spot size converter to these.

Means to Solve the Problems

An optical converter according to a first aspect of the present invention is provided with: a first waveguide, a second waveguide, and a tapered waveguide arranged between both the waveguides; wherein heights of a core of the first waveguide and a core of the second waveguide are different; both ends in a direction of wave guiding of a core of the tapered waveguide are respectively connected to the core of the first waveguide and the core of the second waveguide;

cross-sectional shapes and refractive indices of cores of two waveguides that are connected change continuously or in a stepwise manner at each connection part; and a cross-sectional shape and refractive index of the core of the tapered waveguide change continuously or in a stepwise manner along a direction of wave guiding.

In the optical converter of a first developed configuration, the core of the first waveguide and the core of the second waveguide have different widths.

In the optical converter of a second developed configuration, directions of wave guiding of two waveguides that are connected match at each connection part.

In the optical converter of a third developed configuration, the width of the core of the tapered waveguide changes monotonically along a direction of wave guiding or is a combination of a portion that changes monotonically and a portion that is constant.

In the optical converter of a fourth developed configuration, the height of the core of the tapered waveguide changes monotonically along a direction of the waveguide or is a combination of a portion that changes monotonically and a portion that is constant.

In the optical converter of a fifth developed configuration, bottom faces of the cores of the first waveguide, the second waveguide, and the tapered waveguide are all on the same plane.

In the optical converter of a sixth developed configuration, the length in a direction of wave guiding of the tapered waveguide is at least 10 times the larger of: a difference between the width of the core of the first waveguide and that of the core of the second waveguide, and a difference between the height of the core of the first waveguide and that of the core of the second waveguide.

In the optical converter of a seventh developed configuration, an uppera top face of the core of the tapered waveguide includes an inclined plane forming an angle between 0 degrees and 90 degrees with an bottom face, and a direction of a normal to the inclined plane projected on the bottom face matches the direction of wave guiding of the tapered waveguide.

In the optical converter of an eighth developed configuration, an angle between the inclined plane and the bottom face of the core of the tapered waveguide is less than or equal to 30 degrees.

In the optical converter of a ninth developed configuration, the top face of the core of the tapered waveguide includes a concave face and a convex face; a tangential plane at an arbitrary position of the concave face and the convex face forms an angle less than or equal to 30 degrees with the bottom face of the core of the tapered waveguide; and a direction of a normal to the tangential plane projected on the bottom face matches the direction of wave guiding.

In the optical converter of a tenth developed configuration, a refractive index of a core is greater than or equal to 3 and a refractive index of cladding is less than or equal to 2.

An optical converter according to a second aspect of the present invention is provided with a tapered waveguide arranged between a first waveguide and a second waveguide, wherein both ends in a direction of wave guiding of a core of the tapered waveguide are respectively connected to a core of the first waveguide and a core of the second waveguide; at each connection part, cross-sectional shapes and refractive indices of cores of two waveguides that are connected change continuously or in a stepwise manner; and a cross-sectional shape and refractive index of the core of the tapered waveguide change continuously or in a stepwise manner along a direction of wave guiding.

In an eleventh developed configuration, an optical integrated circuit includes the abovementioned optical converter on a single SOI substrate.

A method of manufacturing an optical converter according to a third aspect of the present invention comprises: fabricating core material provided with a stepped structure in which a thick film and a thin film are connected via a taper in a direction of thickness, to form a tapered waveguide; wherein the method includes a process of forming a waveguide core in a wire shape so as to intersect a normal to a tangential plane of a top face of a core of the tapered waveguide, in a direction of a projection of the normal projected on a bottom face of the core of the tapered waveguide.

The method of manufacturing an optical converter of a twelfth developed configuration, includes, in a range in which a tapered portion intersects the stepped structure, a process of fabricating such that a width of the core of the tapered waveguide decreases monotonically along a direction from a lower side of the stepped structure to a higher side of the stepped structure, or a process of fabricating to have a combination of a portion that decreases monotonically and a portion that is constant.

The method of manufacturing an optical converter of a thirteenth developed configuration, comprises, in a range in which the tapered portion intersects the stepped structure, a process of fabricating such that the width of the core of the tapered waveguide is constant, and a process of fabricating such that the width of the core of the tapered waveguide, in a thicker portion of the stepped structure, decreases monotonically.

A method of manufacturing an optical integrated circuit of a fourteenth developed configuration is a method of manufacturing the optical integrated circuit for a single SOT substrate, and preferably includes a method of manufacturing the abovementioned optical converter.

Meritorious Effects of the Invention

According to the optical converter of the present invention it is possible to mutually connect optical waveguides with different heights, and it is possible to change the height of waveguide core according to location. Therefore, it is possible to make the core height low in a portion of a linear waveguide, and to make the core height high in a portion of a bent waveguide. As a result, it is possible to reduce loss and increase integration in the optical integrated circuit at the same time, and to eliminate opposing relationship in a trade-off between these in the conventional cases.

Furthermore, according to the optical converter of the present invention, it is possible to gradually change the core height, and it is possible to couple optical waveguides with different heights without loss. In addition, according to the optical converter of the present invention, by gradually changing the core width, it is possible to have an arrangement such that optical waveguides of both sides coupled via the optical converter are both single mode waveguides.

By applying the method of manufacturing the optical converter of the present invention to a single SOI substrate, it is possible to improve productivity of the optical integrated circuit.

Figure 1:
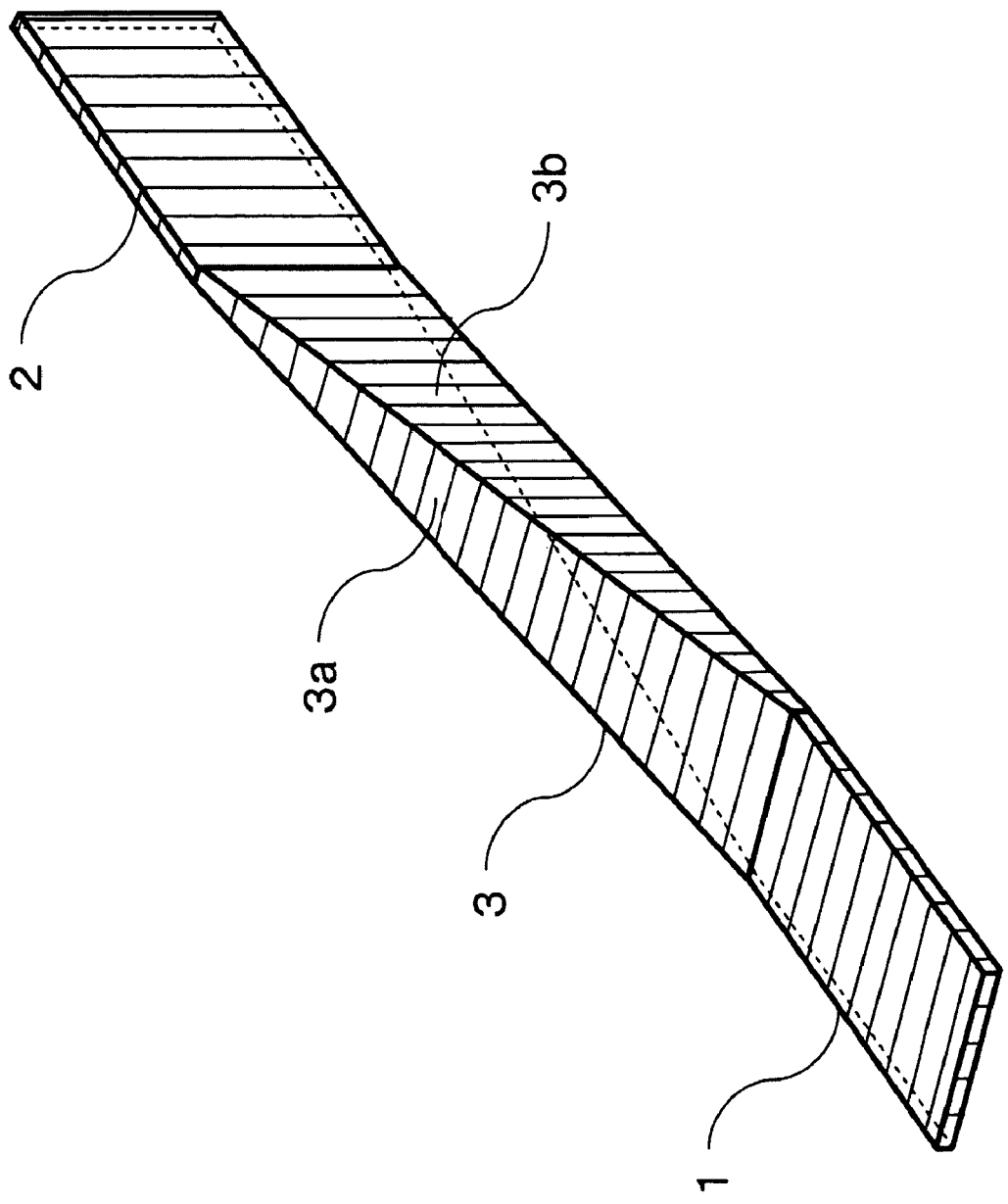
FIG. 1 is a perspective view of an optical converter based on a first exemplary embodiment of the present invention.

EXPLANATIONS OF SIGNS 1 core of first waveguide
2 core of second waveguide
3 core of tapered waveguide
3a top face of core 3
3b both side faces of core 3
4 first core portion of tapered waveguide
5 second core portion of tapered waveguide
4a top face of first core portion 4
4b both side faces of first core portion 4
5a top face of second core portion 5
5b both side faces of second core portion 5
6 core material (silicon active layer of SOI substrate)
7 cladding material (silicon dioxide layer of SOI substrate)

PREFERRED MODES FOR CARRYING OUT THE INVENTION

An optical converter according to an embodiment of the present invention is provided with: a core (1 in FIG. 1) of a first waveguide, a core (2 in FIG. 1) of a second waveguide, which is different in height to the core of the first waveguide, and a core (3 in FIG. 1) of a tapered waveguide; two ends of the core of the tapered waveguide are respectively connected to the core of the first waveguide and the core of the second waveguide; at a connection part of the core of the first waveguide and the core of the tapered waveguide, and at a connection part of the core of the second waveguide and the core of the tapered waveguide, cross-sectional shapes and refractive indices of cores of two waveguides, which are respectively connected, change continuously or in a stepwise manner (that is, nearly continuously); and a cross-sectional shape and a refractive index of the core of the tapered waveguide change continuously or in a stepwise manner (that is, nearly continuously).

Furthermore, the core of the first waveguide and the core of the second waveguide have different widths.

Moreover, it is preferable that a direction of wave guidancewave guiding of the first waveguide and a direction of wave guiding of the tapered waveguide, in a vicinity of a connection end with the first waveguide, match, and a direction of wave guiding of the second waveguide and a direction of wave guiding of the tapered waveguide, in a vicinity of a connection end with the second waveguide, match.

Furthermore, a width of the core in a cross-section perpendicular to an axis of wave guiding of the tapered waveguide, in a progress starting from a connection end of the core of the first waveguide reaching a connection end of the core of the second waveguide, may monotonically decrease or may be a combination of a portion that decreases monotonically and a portion that is constant.

In addition, a height of the core in a cross-section perpendicular to a direction of wave guiding of the tapered waveguide, in the course from the connection end with the core of the first waveguide to the connection end with the core of the second waveguide, may monotonically increase or may be a combination of a portion that increases monotonically and a portion that is constant.

The bottom faces of the core of the first waveguide, the core of the second waveguide, and the core of the tapered waveguide may all be preferably on the same plane.

Furthermore, the length of the core of the tapered waveguide is preferably at least 10 times the larger of: a difference between a width of the core of the first waveguide and that of the core of the second waveguide, and a difference between a height of the core of the first waveguide and that of the core of the second waveguide.

In addition, a top face (3a in FIG. 1) of the core of the tapered waveguide preferably includes an inclined plane forming an angle between 0 degrees and 90 degrees with an bottom face of the core of the tapered waveguide; and a direction of a projection of a normal to the inclined plane, projected on the bottom face preferably matches or nearly matches the direction of wave guiding of the tapered waveguide.

Moreover, an angle formed by the inclined plane and the bottom face of the core of the tapered waveguide is preferably less than or equal to 30 degrees.

Furthermore, the top face (3a in FIG. 1) of the core of the tapered waveguide may include a concave face and a convex face; a tangential plane at an arbitrary position of the concave face or the convex face may form an angle less than or equal to 30 degrees with the bottom face of the core of the tapered waveguide; and a direction of a projection of a normal, normal to the tangential plane, projected on the bottom face may match or nearly match the direction of an axis of wave guiding.

Moreover, refractive indices of the cores are preferably greater than or equal to 3, and a refractive index of cladding is preferably less than or equal to 2.

In addition, the optical converter according to another embodiment of the present invention is formed by fabricating a core material (6 in FIG. 3), provided with a stepped structure in which a thick film and a thin film are connected via a taper in a direction of thickness, so as to form a waveguide core in a wire (fine line) shape extending traversing the core material in a direction of a projection of normal to a tangential plane of a top face of the taper, projected on an bottom face of the taper.

Moreover, in a range in which the taper is intersected (passed), fabrication may be such that the width of the wire (that is, the core) decreases monotonically along a direction starting from a lower side of a stepped structure towards a higher side of a stepped structure, or that a portion that decreases monotonically and a portion that is constant are combined.

In addition, a method of manufacturing such optical converters is applied to a single SOI substrate and an optical integrated circuit is manufactured.

Exemplary Embodiment 1

Next, a detailed description is given concerning a first exemplary embodiment of the present invention, making reference to the drawings.

An optical circuit, which is provided with waveguides in which core heights are different, is realized by using mode-field conversion having a core form as shown in FIG. 1. The optical converter is provided with a first waveguide, a second waveguide, and a tapered waveguide arranged between the two waveguides, wherein heights of a core 1 of the first waveguide and a core 2 of the second waveguide are different; both ends in a direction of wave guiding of a core 3 of the tapered waveguide are respectively connected to the core 1 of the first waveguide and the core 2 of the second waveguide; cross-sectional shapes and refractive indices of cores of two waveguides that are connected change continuously or nearly continuously at each connection part; and a cross-sectional shape and refractive index of the core 3 of the tapered waveguide change continuously or nearly continuously in a direction of wave guiding.

Widths of the core 1 of the first waveguide and the core 2 of the second waveguide may be different.

In a tapered waveguide with a simplest structure, the direction of wave guiding of the tapered waveguide is constant through the entire length of the tapered waveguide. However, the tapered waveguide may be curved, due to a manufacturing error or according to deliberate design. Therefore, at respective connection locations when the core 3 of the tapered waveguide is connected to the core 1 of the first waveguide and the core 2 of the second waveguide, it is preferable that directions of wave guiding of two waveguides, which are connected, match.

The width of the core 3 of the tapered waveguide may change monotonically in a direction of wave guiding, or there may be a combination of a portion that changes monotonically and a portion that is constant.

On the other hand, the height of the core 3 of the tapered waveguide may change monotonically in a direction of wave guiding, or there may be a combination of a portion that changes monotonically and a portion that is constant.

Bottom faces of the core 1 of the first waveguide, the core 2 of the second waveguide, and the core 3 of the tapered waveguide may all be on the same plane.

Two side faces 3b of the core 3 of the tapered waveguide are configured as faces orthogonal to a bottom face of the core 3 and an inclined face (plane) 3a that is a top face, and a taper formed of the inclined face 3a and the bottom face, forms a taper in the reverse direction.

In order to smoothly connect the core 1 of the first waveguide and the core 2 of the second waveguide, the length of the core 3 of the tapered waveguide is preferably at least 10 times the larger of a difference between a width of the core 1 of the first waveguide and that of the core 2 of the second waveguide, and a difference between a height of the core 1 of the first waveguide and that of the core 2 of the second waveguide.

The top face of the core 3 of the tapered waveguide preferably includes the inclined plane 3a forming an angle between 0 degrees and 90 degrees with the bottom face of the core 3 of the tapered waveguide, and a direction of a projection of a normal of the inclined plane 3a, projected on the bottom face of the core 3 of the tapered waveguide preferably matches or nearly matches that of wave guiding of the taper.

Furthermore, in order to smoothly connect the core 1 of the first waveguide and the core 2 of the second waveguide, an angle between the inclined plane 3a and the bottom face of the core 3 of the tapered waveguide is preferably less than or equal to 30 degrees.

At a connection part of the core 1 of the first waveguide and the core 3 of the tapered waveguide, and at a connection part of the core 2 of the second waveguide and the core 3 of the tapered waveguide, it is desirable that cross-sectional shapes and refractive indices of cores of two waveguides, which are connected, are completely continuous respectively, but there are cases where small discontinuities, in a step-like form, occur in manufacturing, in other words, there are cases of near continuity. In this way, even in the case of near continuity, if the degree of discontinuity thereof is small, there is no problem in practice since reflection and loss of guided light arising from this can be ignored.

In the same way, it is desirable that the cross-sectional shape and the refractive index of the core 3 of the tapered waveguide be completely continuous between its ends, but there are cases where small discontinuities, in a step-like form, occur in manufacturing, in other words, there are cases of changing in a nearly continuous manner. In this way, even in cases of changing in a nearly continuous manner, if the degree of discontinuity thereof is small, reflection or loss of guided light ascribable to this can be ignored, and thus there is no problem in practice.

In addition, it is desirable that the top face of the core 3 of the tapered waveguide includes the inclined plane 3a forming an angle between 0 degrees and 90 degrees with the bottom face of the core 3 of the tapered waveguide, and that a direction of a projection of a normal of the inclined plane 3a, projected on the bottom face of the core 3 completely matches a direction of wave guiding, but there are cases where small discontinuities, in a step-like form, occur in manufacturing, in other words, there are cases of near matching. In this way, even in cases of near matching, if the degree of a mismatch thereof is small, reflection or loss of guided light arising from this can be ignored, offering no problem in practice.

Exemplary Embodiment 2

Next, a second exemplary embodiment is described, making reference to the drawings. In the first exemplary embodiment, as shown in FIG. 1, tapers in a direction of height and in a direction of width were realized, in a core 3 of a tapered waveguide, at the same time and in reverse directions. However, as in FIG. 2, a configuration may separately have a first core portion 4 and a second core portion 5, in tapered shapes, connected to each other. Furthermore, the first core portion 4 and the second core portion 5 in tapered shapes, may partially overlap, or may be separated by a small gap.

Two side faces 4b of the first core portion 4 of the tapered waveguide are configured as faces orthogonal to a bottom face of the first core portion 4 and an inclined plane 4a of constant width, which is a top face, and are parallel to each other. Furthermore, a distance (space) between the top face 4a of the first core portion 4 and the bottom face increases monotonically from an end of the core 1 towards the second core portion 5. That is, the first core portion 4 forms a tapered structure only in a direction of height.

On the other hand, two side faces 5b of the second core portion 5 of the tapered waveguide are configured as faces orthogonal to an bottom face of the second core portion 5 and a top face 5a of constant height, and the width (distance) between the two side faces 5b decreases monotonically from an end of the first core portion 4 towards the core 2. Furthermore, a distance between the top face 5a of the second core portion 5 and the bottom face is constant. That is, the second core portion 5 forms a tapered structure only with regard to the width (distance) between the two side faces 5b.

Figure 2:
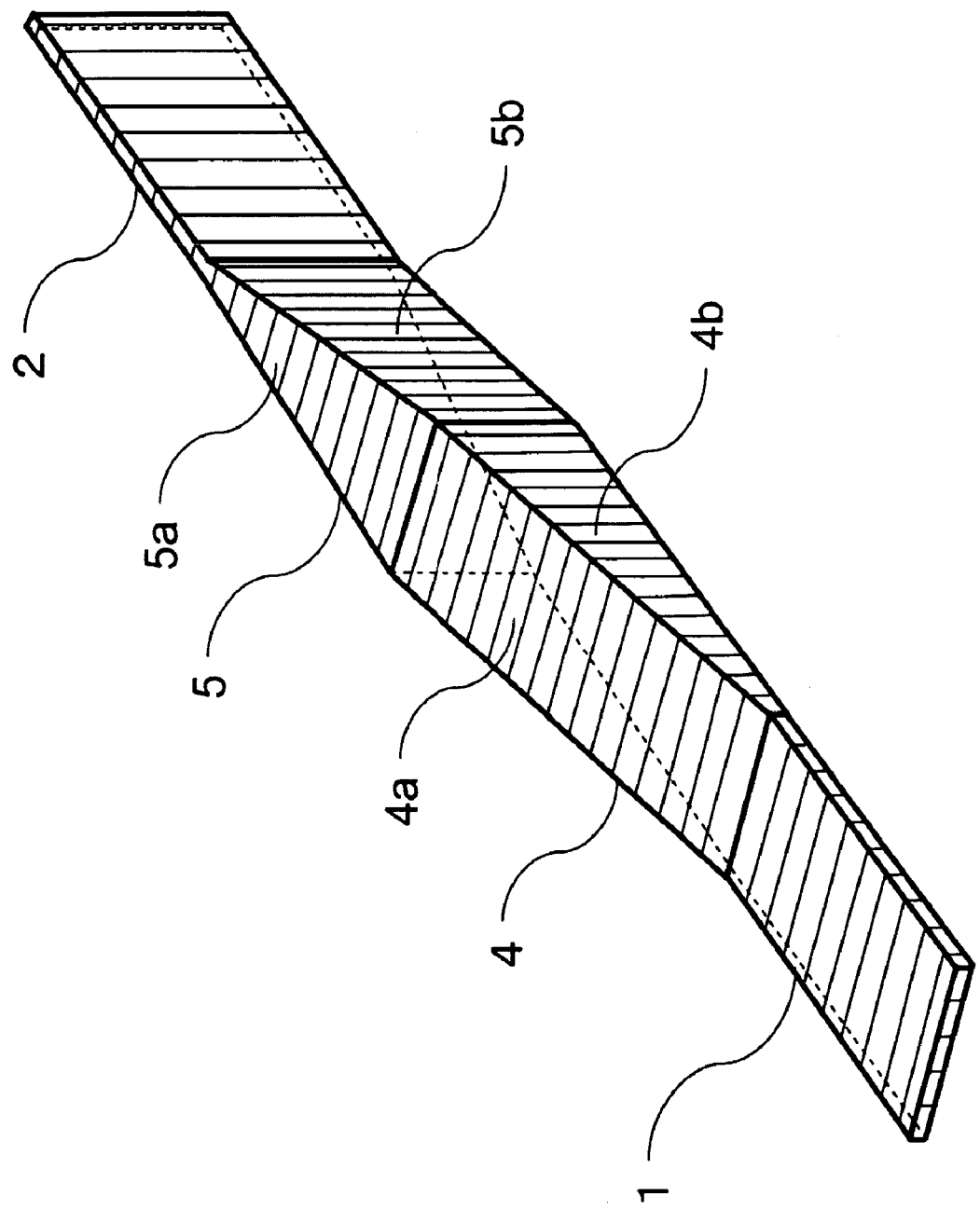
FIG. 2 is a perspective view of an optical converter based on a second exemplary embodiment of the present invention.

In addition, as shown in FIG. 1 and FIG. 2, the top face 3a of the core 3 of the tapered waveguide and the top face 4a of the first core portion 4 of the tapered waveguide need not necessarily be planes or combinations of planes. That is, a structure is possible in which the top face of the core of the tapered waveguide includes a concave face and a convex face; a tangential plane at an arbitrary position of the concave face and the convex face are at an angle less than or equal to 30 degrees with the bottom face of the core 3 of the tapered waveguide and the first core portion 4; and a direction of a projection of a normal to the tangential plane, projected on the bottom face matches or nearly matches the direction of wave guiding.

Furthermore, in order to adequately confine light inside the core, it is preferred that refractive indices of the cores of the first and second tapered waveguides be at least 3, and that a refractive index of cladding be 2 or less.

Manufacture

Next, a method of manufacturing the optical converter of the first exemplary embodiment and the second exemplary embodiment of the present invention is described.

Figure 3:
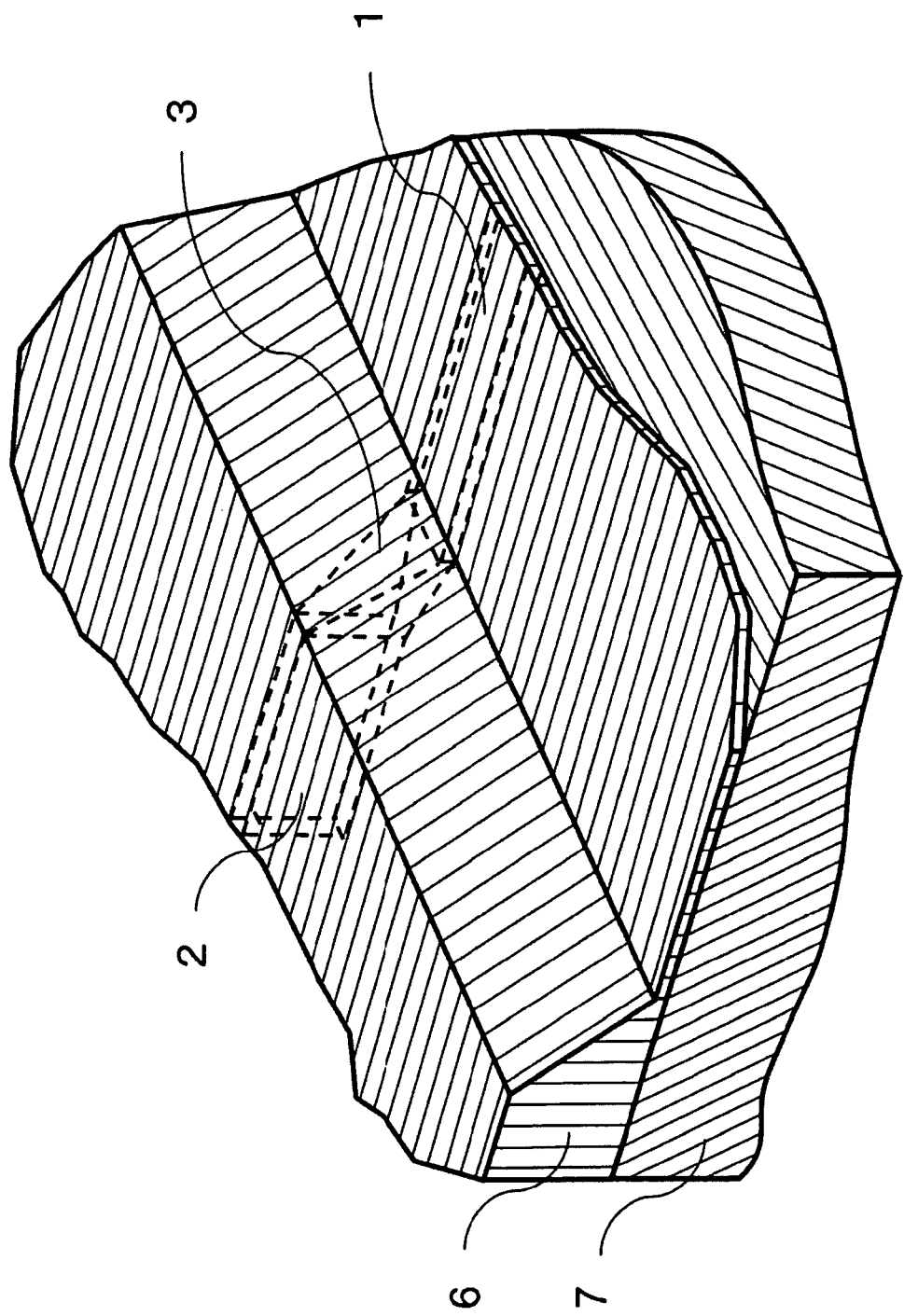
FIG. 3 a drawing for illustrating a method of manufacturing the optical converter based on the first exemplary embodiment of the present invention and an optical integrated circuit including the optical converter.

In the present method of manufacturing, with reference to FIG. 3, using core material 6 provided with a stepped structure in which a thick film portion and a thin film portion are connected via a taper in a direction of thickness (that is, a boundary part), the waveguide core 3 in a wire shape is formed in a way to intersect a normal to the tangential plane of a top face of the taper (refer to 3a of FIG. 1), in a direction of a projection of the normal projected on a bottom face of the taper. That is, the core 3 is formed such that a direction of wave guiding thereof is in a direction perpendicular to a boundary part being a step between the thick film and the thin film. In fact, since the "boundary part" is a taper and has a width, it is not a line. On this account, the abovementioned strict expression is used. In this way, as shown in FIG. 1, it is possible to form the optical converter of the first exemplary embodiment of the present invention.

In addition, in a range in which the stepped structure of a tapered portion is intersected (passed), fabrication may be performed to have a width (that is, a width of the top face 3a), between the two side faces (refer to 3b of FIG. 1) of the core 3 of the tapered waveguide, that decreases monotonically in a direction from a low side of the step to a high side thereof, or fabrication may be performed to have a combination of a portion that decreases monotonically and a portion that is constant.

Figure 4:
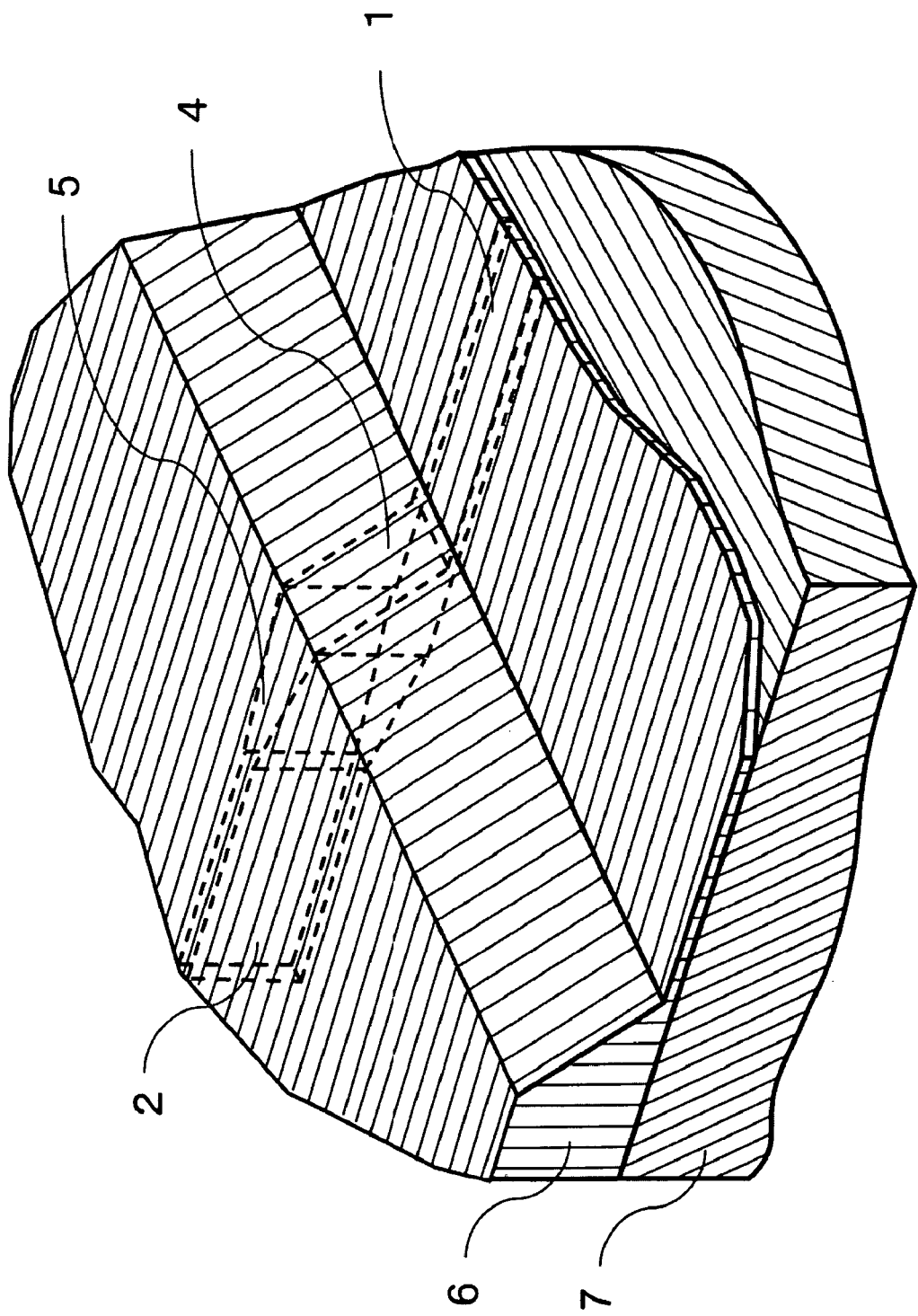
FIG. 4 a drawing for illustrating a method of manufacturing the optical converter based on the second embodiment of the present invention and an optical integrated circuit including the optical converter.

On the other hand, as shown in FIG. 4, in a range in which a stepped structure of the tapered portion is intersected (passed), by fabricating such that a width or a distance (that is, a width of the top face 4a), between the two side faces (refer to 4b in FIG. 2) of the first core portion 4 of the tapered waveguide, is constant, and that a width (that is, a width of the top face 5a), between the two side faces (refer to 5b in FIG. 2) of the second core portion 5 of the tapered waveguide, decreases monotonically, it is possible to form an optical converter based on the second exemplary embodiment of the present invention, as shown in FIG. 2.

In order to implement the abovementioned method of manufacturing according to the present invention, it is possible to use an SOI substrate as a substrate, and also to use a silicon active layer included in the SOI substrate as the waveguide core. By patterning with a photoresist on the silicon active layer of the SOI substrate, and etching using potassium hydroxide solution or a mixture of nitric acid and hydrogen peroxide solution, a tapered step is formed. At this time, a substance that gradually dissolves during etching is used as the photoresist, and its thickness is set greater than or equal to a necessary length of the taper. In this way, a photoresist pattern gradually retracts during etching, and it is possible to make a long gentle taper. After removal of the photoresist, the wire-shaped core of the waveguide is newly formed in a direction in which the step is intersected at right angles. By forming the core part into a wire shape, as an example by anisotropic dry etching, the optical converter is formed.

Here, abovementioned "a direction in which the step is intersected at right angles" means a direction of a projection of a normal to the top face of the taper interposed between a thick film portion and a thin film portion, projected on the bottom face of the taper. Furthermore, "forming the core part into a wire shape" means forming the core material so that a longitudinal direction of the core (in normal cases, matching the direction of wave guiding) is in this projected direction.

INDUSTRIAL APPLICABILITY

According to the present invention, it is possible to realize an optical integrated circuit, in which elemental optical devices with different heights are integrated, on a single SOI substrate. In this way, it is possible to produce the optical integrated circuit in a simple procedure at a low cost, and to contribute to development of next generation high speed optical communication systems.

Modifications and adjustments of embodiments and examples are possible within the bounds of the entire disclosure (including the scope of the claims) of the present invention, and also based on fundamental technological concepts thereof. Furthermore, a wide variety of combinations and selections of various disclosed elements are possible within the scope of the claims of the present invention.

What is claimed is:

1. An optical converter comprising: a first waveguide, a second waveguide, and a tapered waveguide arranged between both the waveguides, wherein
    a height from a bottom face to a top face of a core of said first wave guide is different than a height from a bottom face to a top face of a core of said second wave guide;
    both ends in a direction of wave guiding of a core of said tapered waveguide are connected to said core of said first waveguide and said core of said second waveguide respectively;
    a cross-sectional shape and refractive index of said core of said tapered waveguide change continuously or in a stepwise manner along a direction of wave guiding.

2. The optical converter according to claim 1, wherein said core of the first waveguide and said core of the second waveguide have different widths.

3. The optical converter according to claim 1, wherein directions of wave guiding of two waveguides that are connected match at each connection part.

4. The optical converter according to claim 1, wherein width of said core of said tapered waveguide changes monotonically along a direction of wave guiding or is a combination of a portion that changes monotonically and a portion that is constant.

5. The optical converter according to claim 1, wherein height of said core of said tapered waveguide changes monotonically along a direction of said waveguide or is a combination of a portion that changes monotonically and a portion that is constant.

6. The optical converter according to claim 1, wherein bottom faces of said cores of said first waveguide, said second waveguide, and said tapered waveguide are all on the same plane.

7. The optical converter according to claim 1, wherein the length in a direction of wave guiding of said tapered waveguide is at least 10 times the larger of: a difference between the width of said core of said first waveguide and the width of said core of said second waveguide, and a difference between the height of said core of said first waveguide and the height of said core of said second waveguide.

8. The optical converter according to claim 1, wherein a top face of said core of said tapered waveguide includes an inclined plane forming an angle between 0 degrees and 90 degrees with a bottom face, and a direction of a normal to said inclined plane projected on said bottom face matches the direction of wave guiding of said tapered waveguide.

9. The optical converter according to claim 1, wherein an angle between said inclined plane and said bottom face of said core of said tapered waveguide is less than or equal to 30 degrees.

10. An optical converter comprising: a first waveguide, a second waveguide, and a tapered waveguide arranged between both the waveguides, wherein
a height from a bottom face to a top face of a core of said first wave guide is different than a height from a bottom face to a top face of a core of said second wave guide;
both ends in a direction of wave guiding of a core of said tapered waveguide are connected to said core of said first waveguide and said core of said second waveguide respectively;
a cross-sectional shape and refractive index of said core of said tapered waveguide change continuously or in a stepwise manner along a direction of wave guiding, wherein
said top face of said core of said tapered waveguide includes a concave face and a convex face;
a tangential plane at an arbitrary position of said concave face and said convex face forms an angle less than or equal to 30 degrees with said bottom face of said core of said tapered waveguide; and
a direction of a normal to said tangential plane projected on said bottom face matches the direction of wave guiding.

11. An optical converter comprising: a first waveguide, a second waveguide, and a tapered waveguide arranged between both the waveguides, wherein
a height from a bottom face to a top face of a core of said first wave guide is different than a height from a bottom face to a top face of a core of said second wave guide;
both ends in a direction of wave guiding of a core of said tapered waveguide are connected to said core of said first waveguide and said core of said second waveguide respectively;
a cross-sectional shape and refractive index of said core of said tapered waveguide change continuously or in a stepwise manner along a direction of wave guiding, wherein
said top face of said core of said tapered waveguide includes a concave face and a convex face;
a tangential plane at an arbitrary position of said concave face and said convex face forms an angle less than or equal to 30 degrees with said bottom face of said core of said tapered waveguide; and
a direction of a normal to said tangential plane projected on said bottom face matches the direction of wave guiding, wherein said core of the first waveguide and said core of the second waveguide have different widths.

12. An optical converter comprising: a first waveguide, a second waveguide, and a tapered waveguide arranged between both the waveguides, wherein
a height from a bottom face to a top face of a core of said first wave guide is different than a height from a bottom face to a top face of a core of said second wave guide;
both ends in a direction of wave guiding of a core of said tapered waveguide are connected to said core of said first waveguide and said core of said second waveguide respectively;
a cross-sectional shape and refractive index of said core of said tapered waveguide change continuously or in a stepwise manner along a direction of wave guiding, wherein
said top face of said core of said tapered waveguide includes a concave face and a convex face;
a tangential plane at an arbitrary position of said concave face and said convex face forms an angle less than or equal to 30 degrees with said bottom face of said core of said tapered waveguide; and
a direction of a normal to said tangential plane projected on said bottom face matches the direction of wave guiding,
wherein directions of wave guiding of two waveguides that are connected match at each connection part.

13. An optical converter comprising: a first waveguide, a second waveguide, and a tapered waveguide arranged between both the waveguides, wherein
a height from a bottom face to a top face of a core of said first wave guide is different than a height from a bottom face to a top face of a core of said second wave guide;
both ends in a direction of wave guiding of a core of said tapered waveguide are connected to said core of said first waveguide and said core of said second waveguide respectively;
a cross-sectional shape and refractive index of said core of said tapered waveguide change continuously or in a stepwise manner along a direction of wave guiding, wherein
said top face of said core of said tapered waveguide includes a concave face and a convex face;
a tangential plane at an arbitrary position of said concave face and said convex face forms an angle less than or equal to 30 degrees with said bottom face of said core of said tapered waveguide; and
a direction of a normal to said tangential plane projected on said bottom face matches the direction of wave guiding,
wherein width of said core of said tapered waveguide changes monotonically along a direction of wave guiding or is a combination of a portion that changes monotonically and a portion that is constant.

14. An optical converter comprising: a first waveguide, a second waveguide, and a tapered waveguide arranged between both the waveguides, wherein
a height from a bottom face to a top face of a core of said first wave guide is different than a height from a bottom face to a top face of a core of said second wave guide;
both ends in a direction of wave guiding of a core of said tapered waveguide are connected to said core of said first waveguide and said core of said second waveguide respectively;
a cross-sectional shape and refractive index of said core of said tapered waveguide change continuously or in a stepwise manner along a direction of wave guiding, wherein
said top face of said core of said tapered waveguide includes a concave face and a convex face;
a tangential plane at an arbitrary position of said concave face and said convex face forms an angle less than or equal to 30 degrees with said bottom face of said core of said tapered waveguide; and
a direction of a normal to said tangential plane projected on said bottom face matches the direction of wave guiding,
wherein height of said core of said tapered waveguide changes monotonically along a direction of said waveguide or is a combination of a portion that changes monotonically and a portion that is constant.

15. An optical converter comprising: a first waveguide, a second waveguide, and a tapered waveguide arranged between both the waveguides, wherein
- a height from a bottom face to a top face of a core of said first wave guide is different than a height from a bottom face to a top face of a core of said second wave guide;
- both ends in a direction of wave guiding of a core of said tapered waveguide are connected to said core of said first waveguide and said core of said second waveguide respectively;
- a cross-sectional shape and refractive index of said core of said tapered waveguide change continuously or in a stepwise manner along a direction of wave guiding, wherein
- said top face of said core of said tapered waveguide includes a concave face and a convex face;
- a tangential plane at an arbitrary position of said concave face and said convex face forms an angle less than or equal to 30 degrees with said bottom face of said core of said tapered waveguide; and
- a direction of a normal to said tangential plane projected on said bottom face matches the direction of wave guiding,
wherein bottom faces of said cores of said first waveguide, said second waveguide, and said tapered waveguide are all on the same plane.

16. An optical converter comprising: a first waveguide, a second waveguide, and a tapered waveguide arranged between both the waveguides, wherein
- a height from a bottom face to a top face of a core of said first wave guide is different than a height from a bottom face to a top face of a core of said second wave guide;
- both ends in a direction of wave guiding of a core of said tapered waveguide are connected to said core of said first waveguide and said core of said second waveguide respectively;
- a cross-sectional shape and refractive index of said core of said tapered waveguide change continuously or in a stepwise manner along a direction of wave guiding, wherein
- said top face of said core of said tapered waveguide includes a concave face and a convex face;
- a tangential plane at an arbitrary position of said concave face and said convex face forms an angle less than or equal to 30 degrees with said bottom face of said core of said tapered waveguide; and
- a direction of a normal to said tangential plane projected on said bottom face matches the direction of wave guiding,
wherein the length in a direction of wave guiding of said tapered waveguide is at least 10 times the larger of: a difference between the width of said core of said first waveguide and the width of said core of said second waveguide, and a difference between the height of said core of said first waveguide and the height of said core of said second waveguide.

* * * * *